July 21, 1964 R. HIMELSBAUGH 3,141,322
AUTOMATIC CALIBRATION APPARATUS FOR THERMAL CONTROLS
Filed Oct. 19, 1961 9 Sheets-Sheet 1

INVENTOR.
RUDOLPH HIMELSBAUGH
BY
Oldham & Oldham
ATTYS.

July 21, 1964 R. HIMELSBAUGH 3,141,322
AUTOMATIC CALIBRATION APPARATUS FOR THERMAL CONTROLS
Filed Oct. 19, 1961 9 Sheets-Sheet 2

INVENTOR.
RUDOLPH HIMELSBAUGH
BY Oldham & Oldham
ATTYS.

July 21, 1964 R. HIMELSBAUGH 3,141,322
AUTOMATIC CALIBRATION APPARATUS FOR THERMAL CONTROLS
Filed Oct. 19, 1961 9 Sheets-Sheet 3
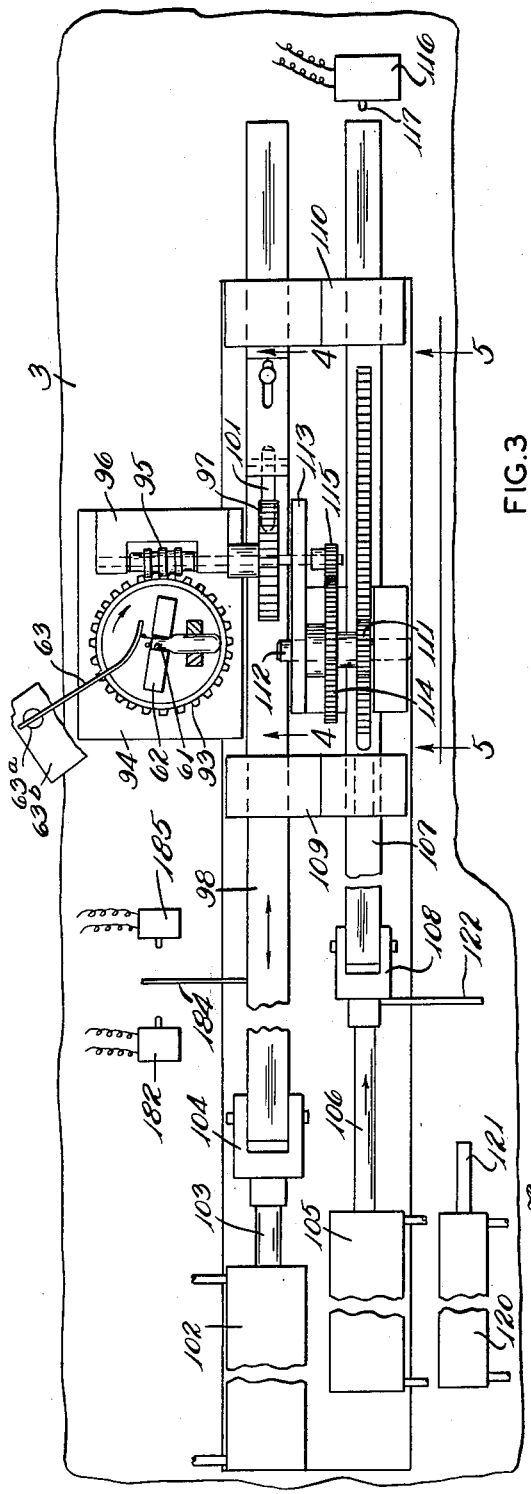
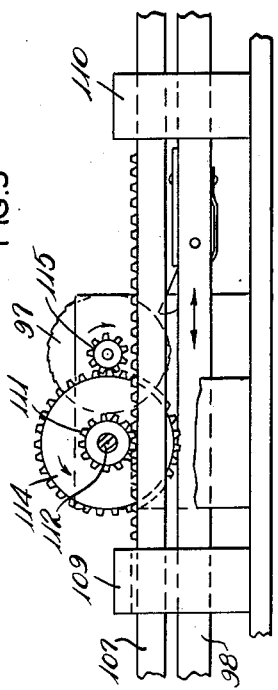
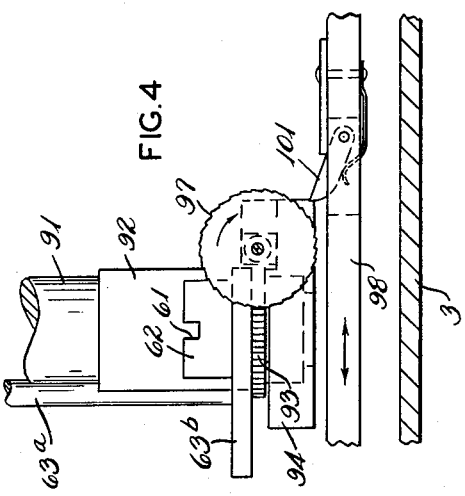
INVENTOR.
RUDOLPH HIMELSBAUGH
BY Oldham & Oldham
ATTYS.

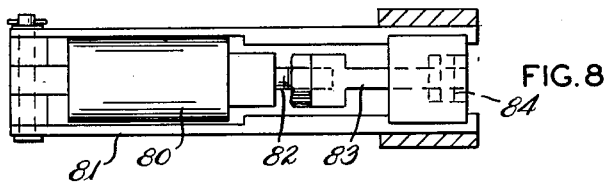
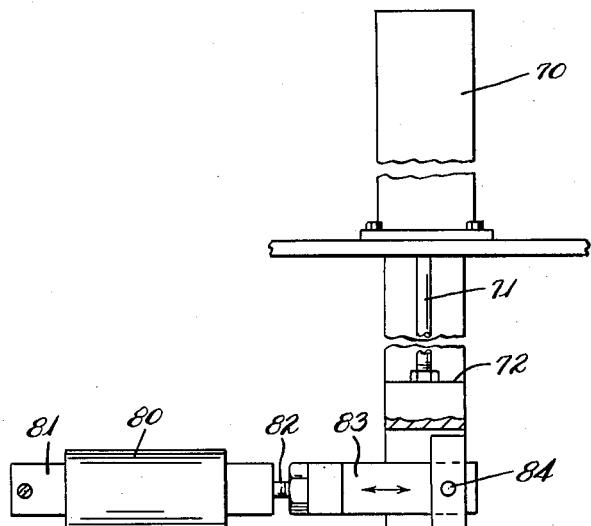
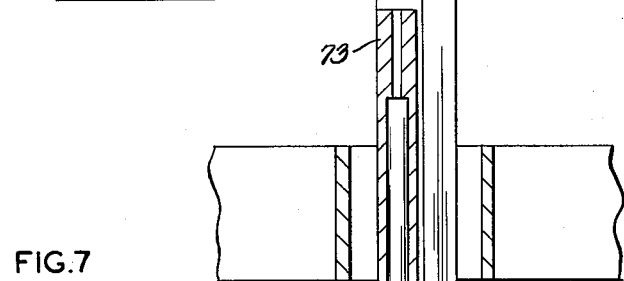
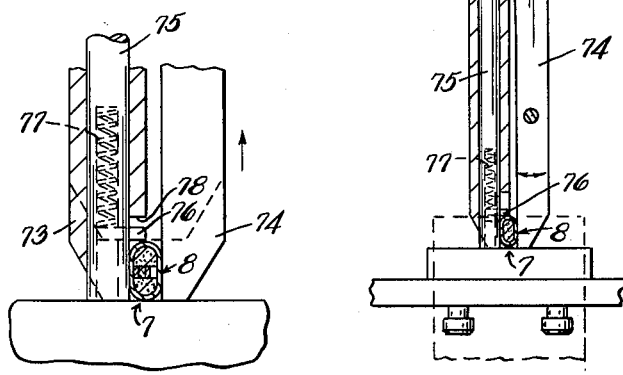

INVENTOR.
RUDOLPH HIMELSBAUGH
BY Oldham & Oldham
ATTYS.

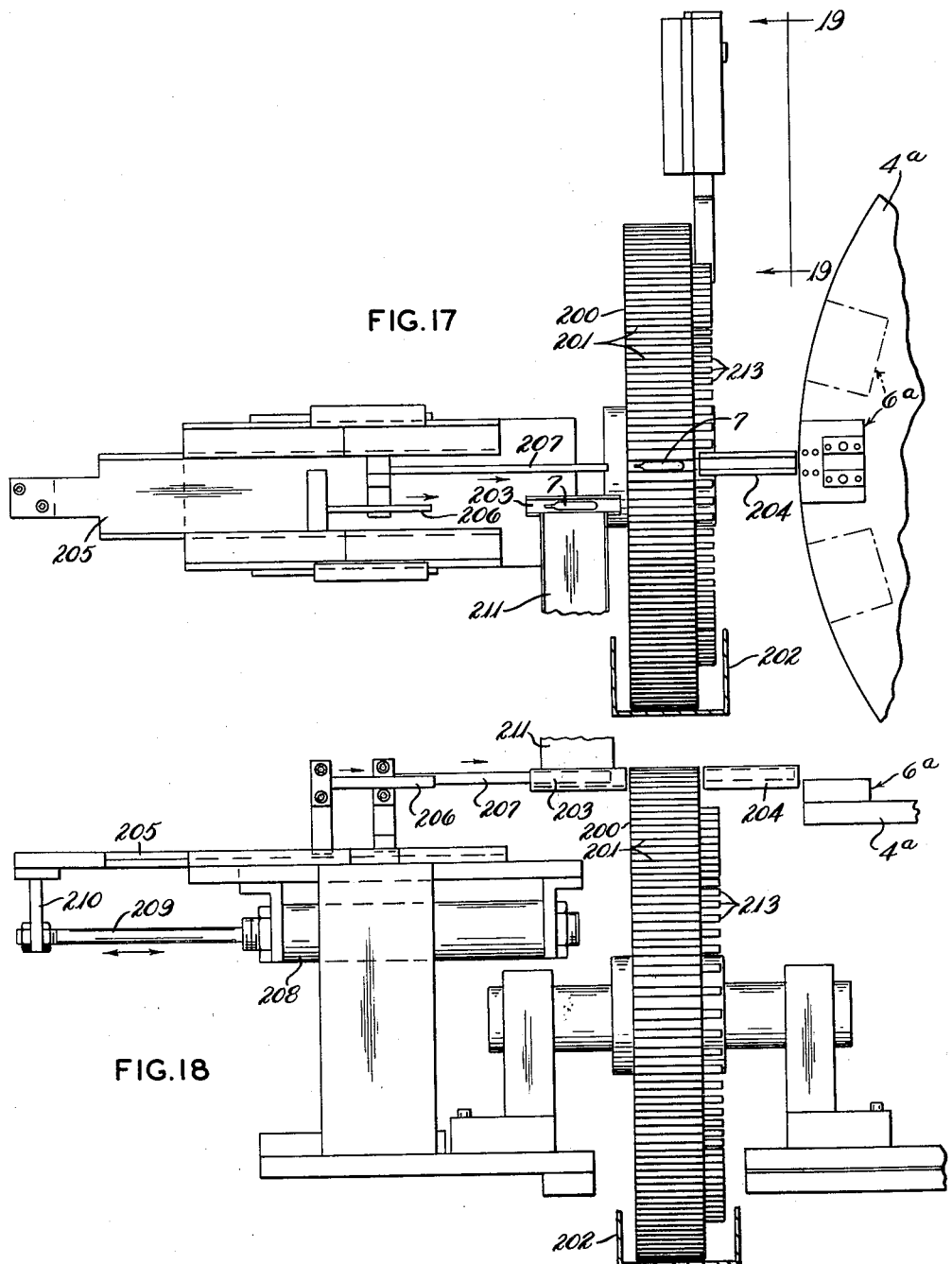

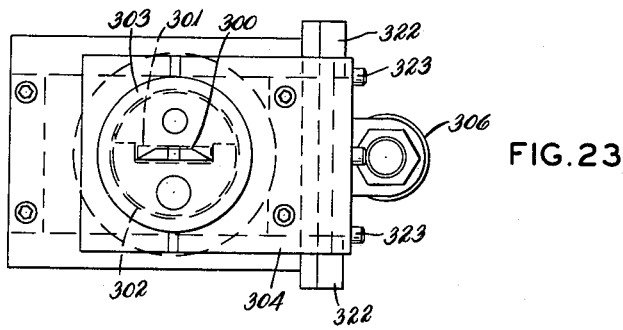
FIG.23
FIG.21
FIG.22
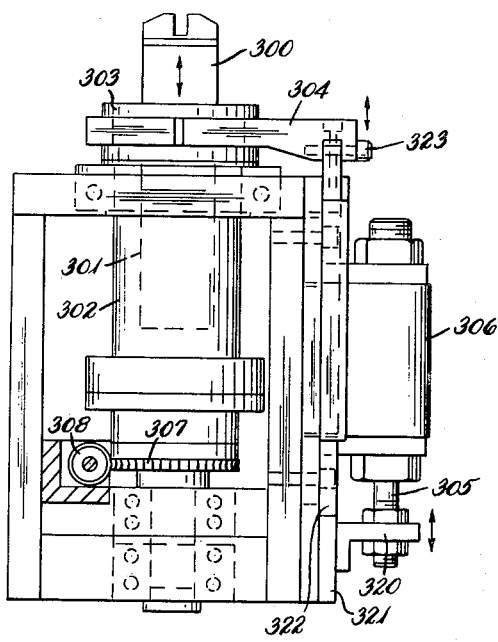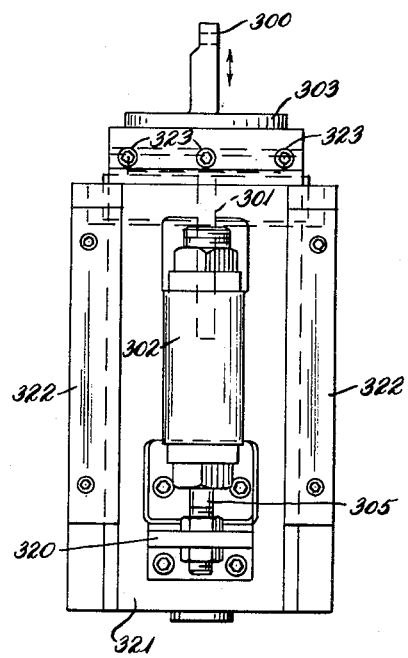

United States Patent Office 3,141,322
Patented July 21, 1964

3,141,322
AUTOMATIC CALIBRATION APPARATUS FOR
THERMAL CONTROLS
Rudolph Himelsbaugh, North Royalton, Ohio, assignor to Mechanical Industries Production Company, Akron, Ohio, a corporation of Ohio
Filed Oct. 19, 1961, Ser. No. 146,237
21 Claims. (Cl. 73—1)

The present invention relates to automatically operating means or apparatus for effecting automatic calibration of thermal controls and protectors, such as motor protectors, thermostats, and the like, so that they will be adjusted to function at predetermined, desired temperatures for circuit control action.

Heretofore many different types of thermal controls and protectors have been provided and various types of calibration means have been used therein. One type of thermal control or protector to which the present invention relates is that where the casing of the control has at least one initially open end and a bimetal strip is secured to such end of the control and extends into the control as a cantilever for operative association with a contact means in the casing for circuit control action. These thermal protectors or controls in most instances are set to open the circuit therein at a predetermined temperature and to close the contacts in the protector by action of the bimetal strip when the temperature of the control is below that temperature established for desired circuit control actions.

Some types of thermal controls made heretofore have been calibrated by bending an end of the casing to change the positioning of a control arm extending into the casing from such end. The invention relates to such types of controls and calibration action.

The general object of the present invention is to provide a novel, automatic apparatus for calibrating, setting, or adjusting thermal protectors of the class described, by automatically functioning apparatus.

Another object of the invention is to feed thermal protectors or like articles automatically to the carrier plate of the invention for automatic supply of properly preheated thermal protectors to the remainder of the apparatus for further processing therein.

A further object of the invention is to provide a small heating oven and article feed unit for holding a plurality of articles to be processed to preheat them to desired temperatures and to supply them individually for transfer to the carrier plate, table, or similar member for further processing action.

Another object of the invention is to provide a member for automatic actuation for indexing the article storing and preheat oven through increments of arcuate movement to present a preheated article for transfer to a different portion of the apparatus, and to lock the storing and preheat oven in desired positions.

Another object of the invention is to provide an apparatus which can operate in a controlled temperature and have a plurality of index or work stations provided therein, and with a plurality of test or calibrating actions being performed at the different work stations.

Another object of the invention is to provide apparatus of the class described where means are present to bend one end of a thermal protector by a continuing series of small increments of movement until the position of the bimetal strip within the casing of the motor protector has been altered, for example, to open previously closed contact means therein.

Another object of the invention is to remove thermal protectors from the apparatus before calibration if its contacts are in an improper position, and to remove properly calibrated thermal protectors from the apparatus automatically.

Other objects of the invention are to provide a work station in the apparatus of the class described and where jaw means fixedly hold one end portion of a thermal protector casing and another member engages another end portion of the thermal protector for bending such portion of the work protector casing with relation to the fixed portion thereof; to provide a vertically movable plunger or ram in the apparatus for bringing the jaw means into engagement with a motor protector case at the work station; to provide a plurality of control actions dependent upon the position of the movable plunger or ram for controlling automatic functioning in the apparatus dependent upon the position of the vertically movable ram; to provide a release action for a motor protector after each increment of bending of an end portion thereof to let the motor protector and associated portions thereof spring back to a normal released position; to terminate, automatically, the bending of a motor protector case end when the contacts therein are opened and remain open when released; to provide a rapidly functioning or moving means in the apparatus for taking up slack therein when starting to bend an end portion of a thermal protector; to provide a stop member in the apparatus for terminating bending of an end of a thermal protector when maximum bending thereof has been achieved without opening the contact means therein; to provide various safeguard means and controls in the apparatus to prevent any functioning of the apparatus at improper times in the cycling thereof; and to provide a plurality of resiliently positioned article supports on a carrier plate at circumferentially spaced portions thereof whereby the article support can be depressed to facilitate engagement of the thermal protector or control by jaw means at a desired work station.

The foregoing and other objects and advanatges of the invention will be made more apparent as the specification proceeds.

In the accompanying drawings, one embodiment of apparatus illustrating the principles of the invention is shown, and in these drawings:

FIG. 3 is a fragmentary plan of the means for bending the thermal control case of a series of small repetitive steps;

Figures 1, 14, 15:
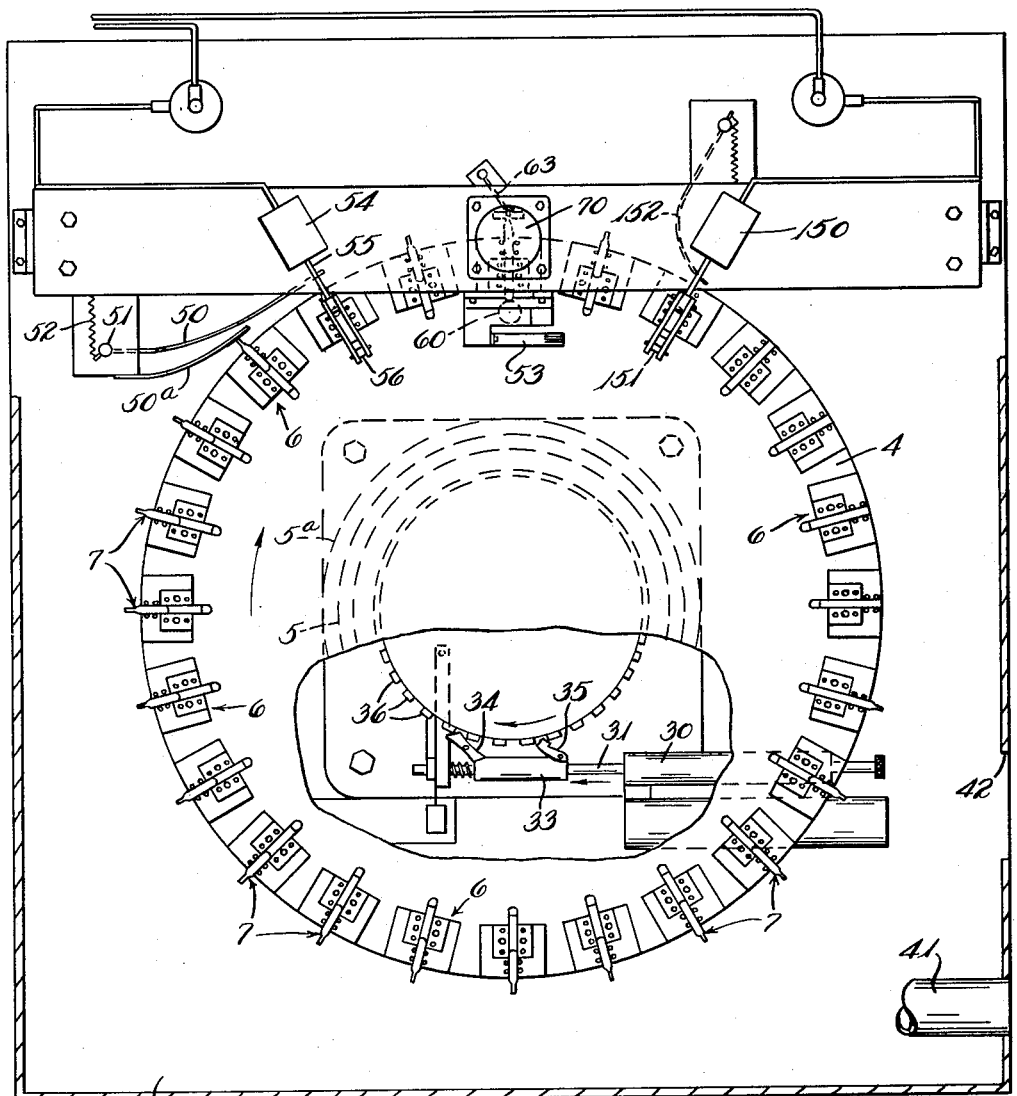
FIG. 1 is a plan view of the apparatus of the invention and with the enclosure thereof being partially broken away and shown in section and with a portion of the carrier plate being broken away to show the indexing movement control means for the carrier plate.
Figure 9:
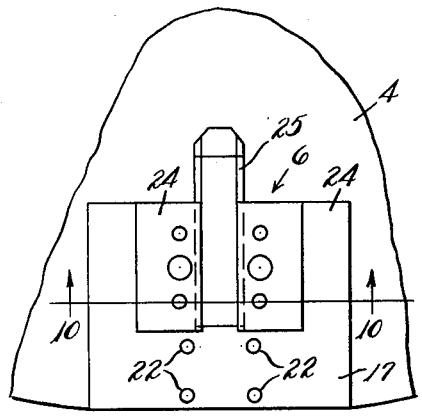
Figure 12:
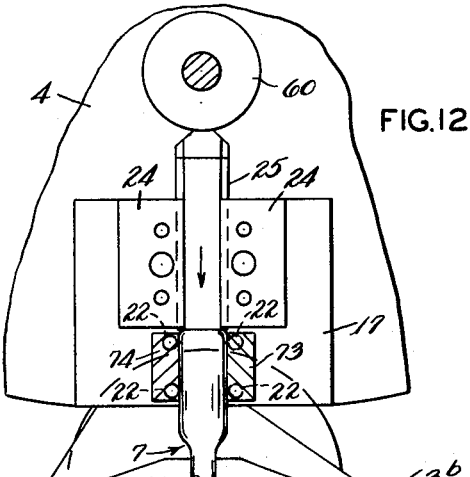
Figure 10:
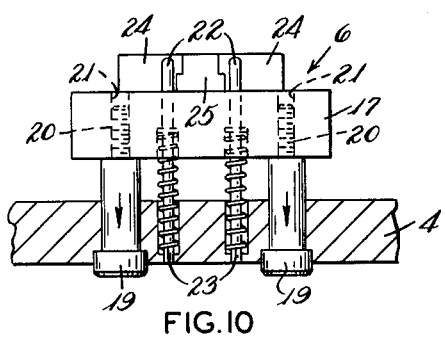
Figure 11:
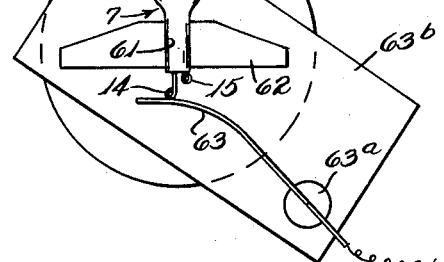
Figure 13:
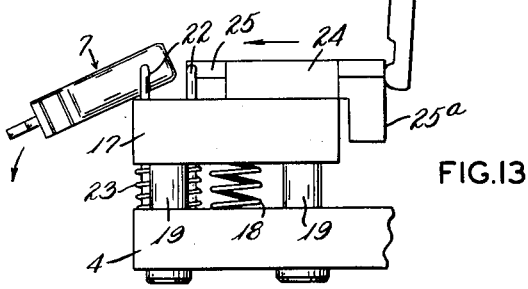
Figure 16:
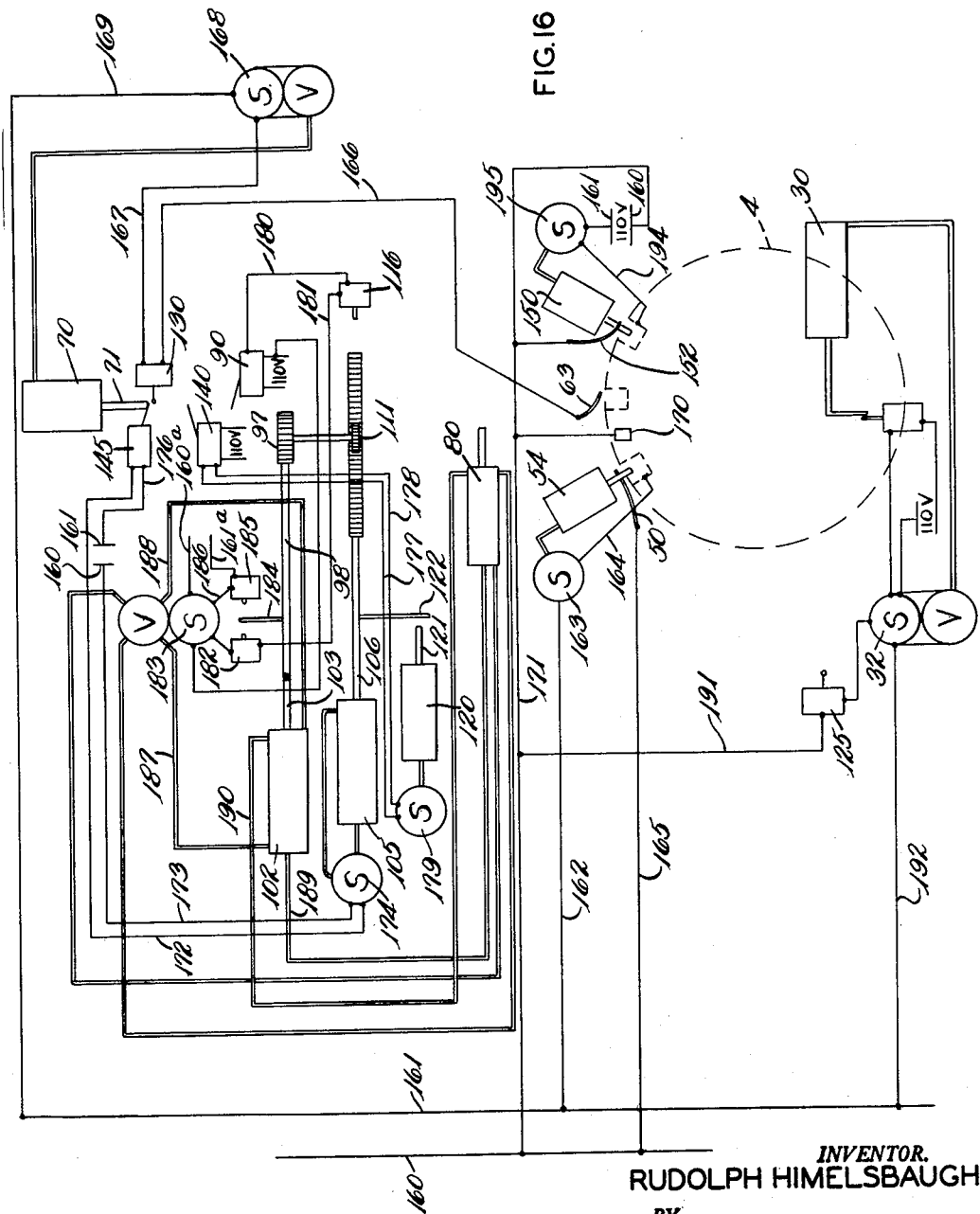
Figure 20:
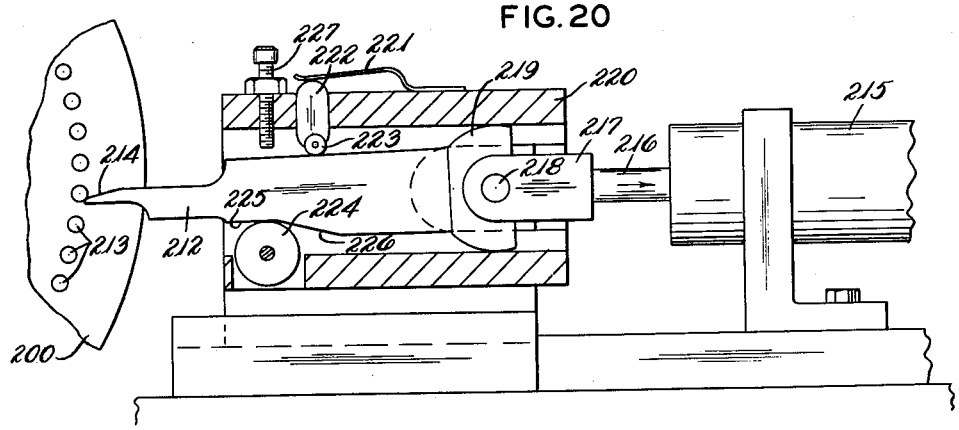
Figure 19:
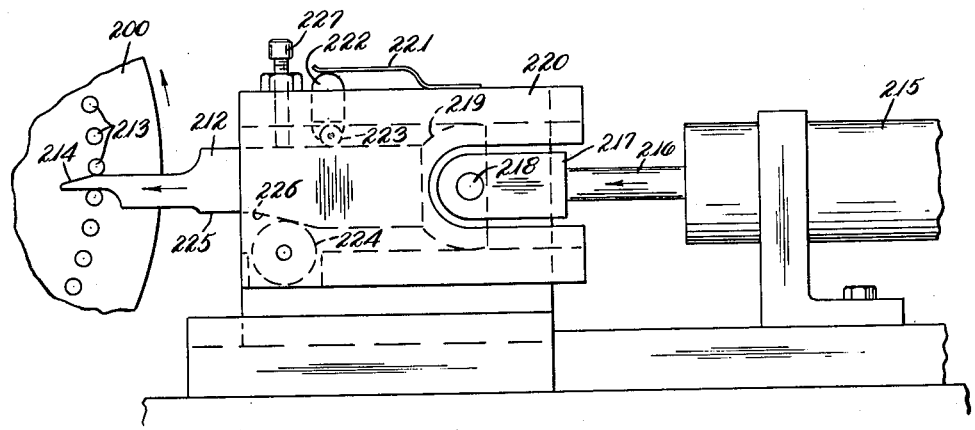

FIGS. 4 and 5 are vertical sections taken on lines 4—4 and 5—5 of FIG. 3, respectively;

FIG. 6 is a fragmentary enlarged elevation, partially broken away and shown in vertical section of the vertically movable ram or plunger assembly of the apparatus;

FIG. 7 is a fragmentary enlarged vertical section of the jaw, or article engaging members of the plunger or ram of FIG. 6;

FIG. 8 is a plan view of the sub-assembly shown in FIG. 6;

FIG. 9 is a fragmentary plan of a portion of the carrier plate showing an article support thereon;

FIG. 10 is a fragmentary vertical section through the carrier plate taken on line 10—10 of FIG. 9 and showing the article support and the resilient mounting means therefor;

FIG. 11 is a side elevation of an article support as normally positioned on the carrier plate;

FIG. 12 is a fragmentary plan view, partially shown in section, showing the thermal protector at the bending work station and the positioning means therefor;

FIG. 13 shows a side elevation of an article support and the ejection means provided for discharging the thermal protector from the apparatus of the invention at a desired test location;

FIGS. 14 and 15 are longitudinal sections through typical thermal protectors of the invention showing it, respectively, with the contacts therein in closed and open positions;

FIG. 16 is a diagrammatic wiring and air flow circuit for the apparatus of the invention;

FIG. 17 is a plan view of a modified portion of the apparatus where a preheat oven and article feed means are associated with the apparatus of the invention;

FIG. 18 is a side elevation of the apparatus shown in FIG. 17;

FIG. 19 is a fragmentary side elevation taken on line 19—19 of FIG. 17;

FIG. 20 is a fragmentary vertical section through the apparatus of FIG. 19 showing the index mechanism in a retracted position;

FIG. 21 is a fragmentary elevation, partly shown in section, of a modified type of an article positioning means at the calibration and bending station with the remainder of the apparatus of the invention being omitted for clarity;

FIG. 22 is a side elevation of the apparatus of FIG. 21; and

FIG. 23 is a plan view of the modified apparatus shown in FIG. 21.

When referring to corresponding members shown in the drawings and also referred to in the specification corresponding numerals are used to facilitate comparison therebetween.

With reference now to the details of the structure shown in the accompanying drawings an automatic calibration apparatus of the invention is indicated as a whole by the numeral 1. The apparatus 1 includes a suitable frame 2 that preferably includes a support table or plate 3 on which most of the apparatus of the invention is carried. The support plate 3 positions a carrier plate 4 thereon for rotation about the center of the carrier plate 4 by any suitable means including a support sleeve 5. The carrier plate 4 preferably is positioned for rotation in a horizontal plane and is insulated from the remainder of the frame 2 by any conventional member such as an insulation sleeve 5a.

As illustrated in FIG. 1 a plurality, of article supports indicated as a whole by the numeral 6 are carried by the carrier plate 4 at uniformly spaced peripheral portions thereof for positioning members, such as motor protectors 7, on each of the article supports 6 for calibration action. FIGS. 14 and 15 show a typical construction for a motor protector such as is adapted for calibration in the apparatus of the invention, but it will be realized that other similar thermal controls or protectors, such as thermostats, or equivalent items can be calibrated in the apparatus of the invention. These motor protectors 7 and other articles calibrated in the apparatus would include a conductive casing 8 normally having one closed end 9 thereon and having one initially open end 10 thereon. These motor protectors shown also include a bimetal strip 11, or equivalent member that extends into the casing 8 from the open end 10 thereof and with such bimetal strip, or equivalent temperature sensitive member extending into the casing as a cantilever and carrying a contact 12 at its free end. The contact 12 is adapted to engage a companion contact 13 secured to the inner surface of the casing 8 spaced from the open end 10 thereof for making and breaking an electrical circuit between these contacts. A suitable terminal loop 14 is provided on the bimetal strip 11 and extends from the casing 8. A companion terminal strip or member 15 is pressed against or secured to the casing 8 and extends therefrom. Conventional insulation material 16 is positioned intermediate the terminals 14 and 15 and also to surround the bimetal strip 11 so that the insulation material can seal the initially open end 10 of the casing when the casing has been suitably compressed or clamped around this insulation material 16 and members received therein.

The details of the individual article supports 6 are best shown in FIGS. 9 through 11 and it is seen that a small flat support plate or bar 17 is resiliently positioned on the carrier plate 4 by a pair of coil springs 18 that engage an upper portion of the carrier plate 4 and are received in suitable recesses formed in the lower surface of the support bar 17. The support bar 17 is held in a fixed position by means of suitable members, such as headed studs 19, that are carried by the carrier plate 4 and which preferably have reduced diameter threaded upper ends 20 that preferably engage tapped apertures 21 provided in the support bars 17 to retain the studs 19 in engagement therewith. Pairs of guide pins 22 also are positioned on the carrier plate 4 to define two parallel rows between which one of the motor protectors 7 can be positioned, as indicated in FIG. 1. These guide pins 22 extend up through the support bars 17 and are resiliently carried on the plate 4, as by means of individual coil springs 23 telescoped over each of the guide pins 22 and engaging associated counterbored portions of apertures in the carrier plate 4 and support bar 17. Any desired member, such as a pin or washer, not shown, can be secured to the guide pins 22 to support them on the springs 23 so that the guide pins normally will be urged upwardly beyond the support bar 17, as shown in FIG. 11, but with these guide pins 22 being movable down into flush relationship with the top surface of the support bar 17 at any given position of such support bar. These rows defined by the guide pins 22 are aligned with a center line between a pair of parallel guide plates 24 suitably secured to the support bar 17 on the upper surface thereof and which receive an ejector key 25 therebetween. The ejector key 25 is urged radially inwardly of the support bar 17 by a coil spring 26 compressed between adjacent portions of the ejector key 25 and including a downwardly extending end flange or lip 25a formed on the ejector key and adjacent surface of the support bar 17. An adjustment screw 27 preferably engages both the flange 25a on the ejector key and the adjacent portion of the support bar 17 to preset the ejector key in desired relation to the support bar. The ejector key 25 thus is aligned with a motor protector 7 positioned by the guide pins 22 and movement of the ejector key 25 radially outwardly of the carrier plate 4 will force the associated motor protector 7 from the article support 6 to fall or otherwise move therefrom depending upon what associated support, or hopper means are provided for the motor protector.

FIG. 1 shows that an automatic means is provided for indexing the carrier plate 4 around predetermined steps of arcuate movement so that for each index action or movement of the carrier plate 4, it will be moved circumferentially a distance equal to that between the center line of two adjacent article supports 6. Thus a control cylinder 30, spring return, is positioned on the support table 3 and it has a plunger, or piston rod 31 extending therefrom. The cylinder 30 can be of any conventional construction and preferably it is air operated and has a suitable solenoid actuated valve 32 positioned thereadjacent for controlling reciprocation of the plunger 31 when the cylinder 30 is actuated. The plunger 31 carries an operating member, or sleeve 33 at one end portion thereof and it carries two dogs or pawls 34 and 35 that operatively engage ratchets or teeth 36 suitably formed in or secured to the support sleeve 5 positioning the carrier plate 4. Thus on each actuation of the cylinder 30, the pawl 35, for example, will engage the sleeve 5 to index or inch the carrier plate 4 from one position to another and with such increments of movement actually being the distance between work stations provided at circumferentially spaced portions of the carrier plate 4 or with the index action being formed in multiples or even fractions of the distance between work stations. The other pawl 34 locks the support sleeve 5 against movement in any direction.

The apparatus as shown actually is provided with three work stations, each of which is spaced two increments of index movement from each other, as hereinafter described in more detail. The pawls 34 and 35 are so associated with the support sleeve 5 as to move such support sleeve 5 only in a clock-wise direction and with a spring (not shown) being associated with the plunger 31 for automatic return of the plunger to a release position where the plunger 31 and dogs 34 and 35 are ready for another index action upon reenergization of the cylinder 30 after it has been energized and released to move again through an operative cycle. The plunger 31 and associated means are retained in engagement with the support sleeve 5 on each energization thereof to retain the sleeve and carrier plate 4 in a given position.

Preferably the motor protectors 7 or other articles to be tested are positioned on an article support 6 and carried around the carrier plate 4 for a major portion of rotation thereof so that such motor protectors can be brought up to a predetermined test temperature. Hence an enclosure 40 normally is provided around the automatic calibration apparatus 1 and forms a part thereof so that any desired heating means can be present in or be supplied to the enclosure 40, or a current of warm air may be supplied thereto, for example, through a conduit 41. Preferably an opening or pivotal door is formed in the enclosure 40, as at 42, whereby an operator can manually position the motor protectors 7 on the article supports 6 adjacent such opening. As described hereinafter, these motor protectors normally will be automatically ejected from the article supports during the automatic functioning of the apparatus. Should the motor protector being processed not be properly ejected, the operator of the apparatus can remove a motor protector that improperly reaches the opening 42 after a complete passage through the apparatus of the invention.

*Pre-Test Station*

Figure 2:
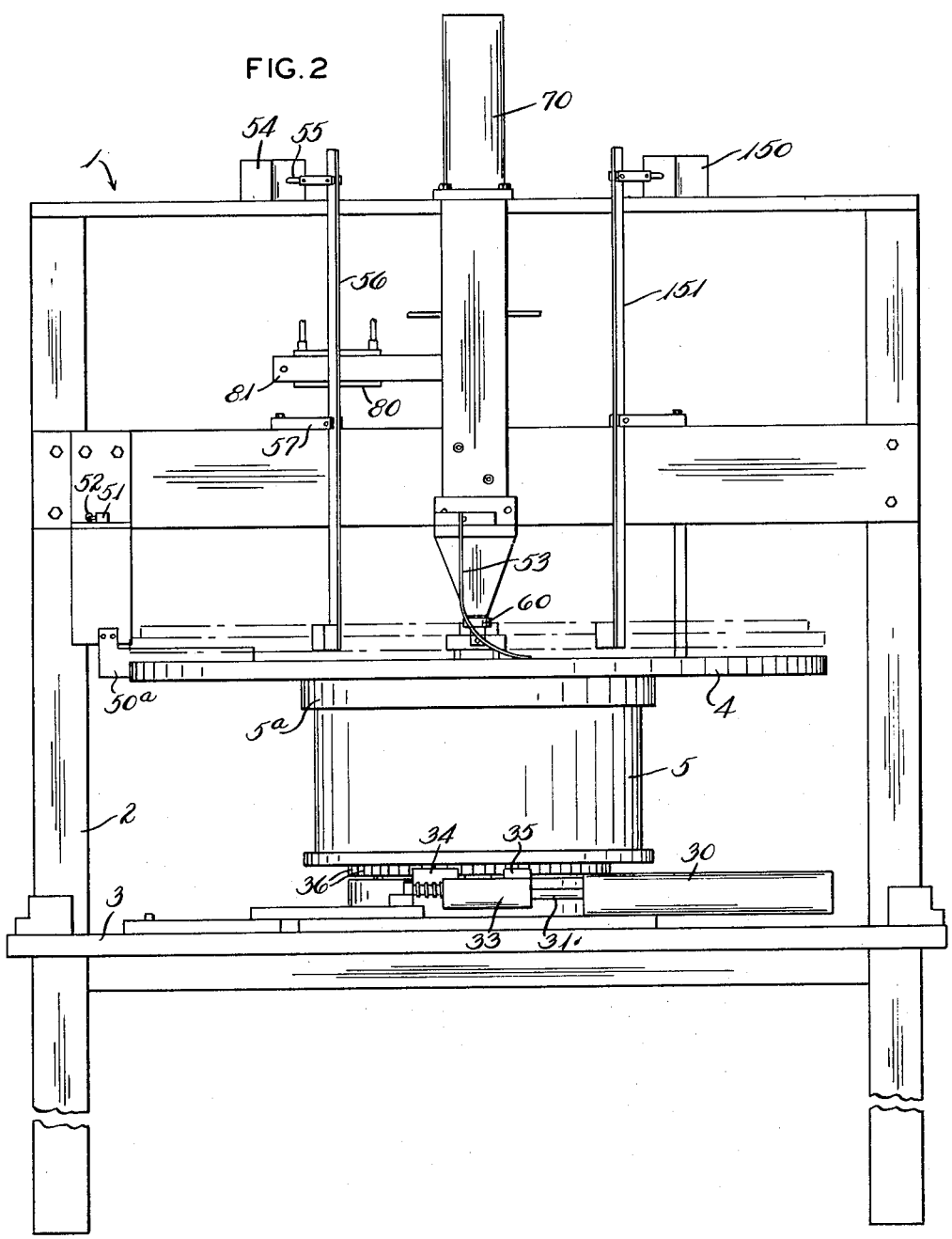
FIG. 2 is a front elevation of the apparatus of FIG. 1 with the enclosure thereon removed.

FIGS. 1 and 2 of the drawings show that a pre-test station is provided on the apparatus of the invention where the motor protectors 7 are tested to determine if the contacts 12 and 13 of the motor protector are in engagement with each other, as is required for functioning of the automatic calibration apparatus 1 of the invention as described herein. This test action is automatically performed and an electrical contact is made with the carrier plate 4, as by means of a resilient spring brush 50, insulated from the frame, that engages a peripheral portion of the carrier plate 4 and which may be positioned on a suitable pin, or equivalent member 51 carried by a portion of the frame 2. Another member, such as a spring 52, also engages this mounting member for the brush 50 and urges it to move arcuately into engagement with the periphery of the carrier plate 4. A second brush 53 is also positioned on a portion of the frame 2 and resiliently bears on an upper surface of the carrier plate 4. Electrical connectors (not shown) in FIG. 1 connect to the brushes 50 and 53 and extend therefrom to control the apparatus as described hereinafter. Hence, a desired control action is produced when a circuit formed between the brushes 50 and 53 is interrupted or changed by motor protectors 7 in the apparatus of the invention, as now to be described in detail. The brush 50 is positioned in the apparatus so that it will be contacted by the terminal 14 extending farther from the motor protector 7 as this motor protector is moved to the first test station in the apparatus. The motor protector 7 projects beyond the periphery of the carrier plate 4, as shown in FIG. 1, when on the article support 6, to raise the brush 50 from contact with the periphery of the carrier plate 4. A positioning spring 50a carried by the frame 2 engages the motor protectors 7 in advance of the first test station to insure that the motor protector is properly pushed into its seat on the support bar 17. An electric circuit normally should be formed immediately, or continuously, through the motor protector 7 at this first test station by the brush 50 contacting the terminal 14 which connects through the contacts 12 and 13 to the casing 8 of the motor protector. Such casing 8 is a conductor and is carried on the metal support bars 17 that are in good electrical engagement, or contact with the carrier plate 4 through the metal studs 19 and other metallic means extending therebetween. Hence if these contacts 12 and 13 are in engagement with each other, which is the normal position for the motor protector being calibrated by the apparatus of the invention, no action is produced in the control circuit. However, should this electrical circuit be opened because of the contacts 12 and 13 being open, as illustrated in FIG. 15, then the opening of the circuit between the brushes 50 and 53 will actuate suitable controls that regulate the operation of a conventional member, such as an air actuated cylinder 54 carried on an upper portion of the frame 2. The cylinder 54 has a plunger 55 extending therefrom that pivotally engages a lever 56 that extends vertically of the frame 2. This lever 56 normally is fulcrumed on the frame 2 as by means of a positioning arm or bracket 57, FIG. 2, and with the lower end of the lever 56 extending to a position adjacent the radially inner margins of the article supports 6 as they are indexed in arcuate movement on the carrier plate provided therefor.

FIG. 13 best illustrates how the lower end of the lever 56, for example, will extend to a point immediately radially inwardly of the downwardly extending edge flange or lip on an ejector key 25 for the article support at the work station. Hence on actuation of the cylinder 54, the lever 56 will be moved radially outwardly of the carrier plate 4 to snap the lower end of the lever into contact with the ejector key 25 and cause the associated motor protector 7 to be moved radially outwardly of the carrier plate and fall therefrom into a suitable guide chute or hopper for receipt of the motor protectors having opened contacts therein at this test station.

*Bending Station*

Should the motor protector being tested have closed contacts therein, as is normal, on two additional index movements of the carrier plate 4, such motor protector 7 will then be brought to the bending station in the apparatus of the invention. The bending station is partially shown in FIG. 1 of the drawings while other views of the bending station are provided in FIGS. 3, 6, 7 and 12 of the drawings. At the test station, the radially inner end of the ejector key 25 engages a rotatable wheel or cam 60, FIG. 12, journalled on a suitable bracket on the frame 2, so that the cam 60 will force the ejector key 25 radially outwardly of the carrier plate and move the motor protector 7 to extend further beyond the periphery of the carrier plate 4. The protruding end of the motor protector now will be received in a slot 61 provided in a yoke or fork 62 extending upwardly in the frame 2 to a position immediately adjacent the periphery of the carrier plate 4. The yoke 62 is carried by members whereby a repetitive progressive arcuate action can be provided to bend or twist this radially outer end of the motor protector 7 for calibration action therein. When the cam 60 forces the motor protector 7 out at the bending station, either then or slightly before such time, the radially outer end of the motor protector 7, by the terminal 14 thereof, will contact a switch arm 63 resiliently positioned immediately adjacent the periphery of the carrier plate at this work station. The switch arm 63, insulated from the frame, is suitably carried on the bending means and a lead from it connects through the brush 53 to a conventional electric control means to control the operating means for a spring return air cylinder 70 positioned on the upper portion of the frame 2, as best shown in FIG. 6. This air cylinder 70 has a plunger or piston rod 71 extending therefrom secured to and controlling the operation of a ram 72 that extends vertically in the automatic calibration apparatus 1 at the work or bend station. The ram 72 is so positioned that it will move one fixed jaw 73 thereon at its lower end into engagement with one side portion of the casing 8 for the motor protector 7 at this test station. A movable jaw 74 is also carried by the ram 73 and it is adapted to be moved to and from engagement with the opposite side of the casing 8 whereby the motor protector 7 will be fixedly engaged between the jaws 73 and 74 when the movable jaw 74 is brought into operative relationship with the fixed jaw 73. The jaws engage a portion of the motor protector 7 adjacent the closed end thereof. The fixed jaw 73 usually has an insert rod 75 provided therein and extending longitudinally thereof to terminate at the lower end of the fixed jaw 73, as shown in FIGS. 6 and 7. Such insert rod 5 has a hold down pin 76 received therein and extending substantially radially therefrom to a position adjacent the upper surface of the motor protector 7 and with such pin 76 being resiliently positioned in the rod 75 by a coil spring 77 received in an end recess 78 in the rod 75. The spring 77 suitably engages the pin 76 to position it for limited vertical movement whereby the pin will resiliently engage a motor protector 7 and urge it to seat down tightly on the support bar 17 as such support bar is forced against the carrier plate 4 by vertical movement of the jaws 73 and 74.

The operation of the movable jaw 74 is controlled by means of a conventional member, such as an air operated cylinder 80 carried by a bracket 81 mounted on the ram 72 and movable therewith. Such air cylinder 80 includes a piston rod or plunger 82 extending therefrom that in turn engages an extension arm or link 83 fixedly secured to an upper portion of the movable jaw 74 by a pin or rivet 84. The air cylinder 80 is of the type that is positively actuated to move in both directions for readily and positively controlling the position of the movable jaw 74 to bring it into clamping engagement with the motor protector or to release the motor protector, as desired.

When the ram 72 has been moved down to its lowermost position, a suitable member, or arm thereon contacts and closes a switch 90. Such switch 90 connects to the controls provided for means used in bending the radially outer end of the motor protector at the bending station by repeated small increments of bending action until open circuit conditions are established for the contacts 12 and 13. It should be noted that the circuit closed through the switch arm 63 will remain closed and energized as long as the motor protector 7 at this bending station has its contacts closed and until such time the air cylinder 70 is energized to retain the plunger 71 and ram 72 at their downward positions. When such circuit through the switch arm 63 is opened by the contacts 12 and 13 moving apart, then the energization of the air cylinder 70 is released and spring return means therein will cause the plunger 71 and ram 72, and associated means, to move back vertically upwardly to their retracted positions.

FIGS. 3 through 5 best show some of the details of the control means provided for moving the fork, or yoke 62 through small increments of arcuate movement for the desired bending action. The yoke 62 is carried by or formed integrally with a support, such as a cylinder or metal block 91 that has a sleeve 92 secured to a lower portion thereof. The sleeve 92 preferably carries a ring gear 93. The metal block 91 is operatively journalled on a bracket or plate 94 that is carried by and forms a part of the frame 2. A support rod 63a for the contact 63 is operatively secured to the block 91, as by a bracket plate 63b. A suitable spring, not shown, urges the contact 63 towards a motor protector positioned for bending action. The metal block 91 is positioned with its longitudinal axis on that of the slot 61 provided in the yoke 62. Increments of arcuate movement are provided to the metal block 91 and associated means by a worm 95 engaging the ring gear 93 and journalled in a bracket 96 carried by the plate 94. A ratchet wheel, or gear 97 is secured to the shaft of the worm gear 95 where it extends from the bracket 96 and such gear 97 is positioned immediately above and aligned with a bar 98 positioned on the frame 2 for limited reciprocation along the longitudinal axis of such bar 98. The bar 98 carries a suitable member, such as a ratchet or pawl 101, thereon that extends upwardly from the bar 98 and is adapted to engage the ring gear 93 to move it through an increment of rotation on each reciprocation of the bar 98.

Controlled reciprocable movement for the bar 98 is provided by means in this instance comprising an air cylinder 102 that has a plunger or piston rod 103 extending therefrom and secured to the bar 98 as by means of a clevis 104. As described hereinafter in more detail, the cylinder 102 has suitable controls connected thereto whereby when energized it will repeatedly oscillate back and forth a desired distance at a desired speed so as to turn the gear, or ratchet wheel 97, and thus the ring gear 93, sleeve 92 and yoke 62 progressively through small increments of arcuate movement, with all increments of movement being in a clockwise direction in the apparatus as shown. Thus, the motor protector 7 at the bending station will be progressively bent at one end until such bending has caused the cantilever section on the bimetal strip 11 to move the contact 12 out of engagement with the contact 13 which will deenergize the ram cylinder 70 and its movement will terminate the oscillating drive provided for the cylinder 102 and cause the apparatus 1 of the invention to automatically move another increment of index movement of the carrier plate 4 for further test and calibrating actions.

Yet a further return or control cylinder 105 is secured to and carried by the support table 3 of the frame 2 and such cylinder is in operative engagement with the yoke 62 and positioning means therefor. The cylinder 105 is normally positioned parallel with the cylinder 102 and has a plunger or piston rod 106 extending therefrom and is secured to a rack bar 107 by a conventional clevis 108. The rack bar 107 is positioned on this support table for reciprocating movement along an axis parallel to the axis of movement of the bar 98. The bar 98 and rack bar 107 may be slidably carried on the frame 2 as by means of brackets 109 and 110 secured to the table 3. The rack formed on the rack bar 107 engages a gear 111 on a stub shaft 112 journalled in a housing 113 carried by the support table 4. The stub shaft 112 also has a gear 114 of relatively large diameter secured thereto and engaging a relatively small diameter spur gear 115 carried by the shaft of the worm gear 95. The gear train means provided thus positively connects the bar 98 and rack bar 107 together and maintains them in proper relationship and provides for control in the arcuate positioning of the metal block 91 by either or both of such bars, as desired.

A slack take-up cylinder 120 also is carried on the support table 3 and has an operative piston rod 121 extending therefrom. The piston rod 121 moves parallel with the piston rod 106 and strikes an arm 122 secured to and protruding laterally from the piston rod 106 so that the cylinder 120, when energized, rapidly moves into contact with the arm 122 to move the gear rack 107 and associated means to take up the slack in the apparatus. The operation of the cylinder 120 is such that it is energized concurrently with the energization of the air cylinder 102 but with the cylinder 120 being adapted to exert a predetermined pressure on the gear rack 107 to cause rapid longitudinal movement thereof and with such movement being transmitted to the metal block 91 and yoke 62 to set up a predetermined turning pressure on the exposed end of the motor protector, but with such pressure normally being below that required to actually permanently bend or distort such portion of the motor protector. Hence the motor protector 7 is rapidly placed into a stress condition whereby further arcuate movement of the metal block 91 will produce increments of bending of the casing 8 to effect a calibration action on the casing and contact support means, or members provided therein. The continuing oscillation, or reciprocation of the bar 98 during the bending action will, in turn, produce longitudinal movement of the rack bar 107 away from the control cylinder 105 provided therefor so that excessive bending of an end of the casing 8 can be prevented by limitation of movement of the rack bar. Such control action is provided by means of a switch 116 carried by the support plate or table 3 so that the rack bar 107 will strike a control pin 117 extending from the switch 116 and close, or open such switch, as desired, in order to terminate the energization of the control circuits for the cylinders 102 and 80 to stop bending of the motor protector at the bending station, even though the contacts therein have not been opened.

A feature of the apparatus of the invention is that the energization means connected to the air cylinder 80 controlling thhe movable jaw 74 is connected to the oscillating actuation means for the cylinder 102 so that on each movement of the air cylinder 102 to retract the pawl 101 for further engagement and advancing action for the gear 97, such cylinder 80 is actuated to move the movable jaw 74 to a released position. Hence, any spring force built up in the motor protector casing 8 is released and only the deformation of the end portion of such casing beyond its elastic limits will be retained and a temporary disengagement of the contacts to affect the bending action of the motor protector can be avoided if such contacts spring back into engagement because of residual forces in the casing after release thereof by the jaws 73 and 74.

When the contacts 12 and 13 are opened, and the ram and plunger 72 and 71 start to move vertically upwardly, then the contact through the switch 90 is opened and this deenergizes the circuit for the cylinder 102 and for the cylinder 80 so that the bar 98 will then be automatically returned to its starting position by the cylinder 105, as later described, for the next desired bending action. As the ram 72 and associated means start to move up, a conventional member on the ram contacts an operative arm on a switch 125 that in turn is connected to a circuit for controlling the index cylinder 30 whereby it will be actuated to index or move the carrier plate 4 through an increment of indexing action and bring the next motor protector 7 to the bending station. A second switch 130 is also contacted by the ram 72 as it is moving upwardly and such switch 130 connects to a normally closed circuit but with the switch being opened by upward movement of the ram. This switch 130 is provided in the energization circuit for the cylinder 70 controlling the ram so that such ram cannot be energized or actuated while indexing action or movement of the carrier plate 4 is being provided.

The release of the ram 72 will permit the support bar 17 on which the motor protector 7 at the bending station is carried to move up from its position down against the carrier plate 4. This action will automatically move the motor protector up out of the slot provided in the yoke 62 and not interfere with any indexing movement provided for the carrier plate.

The ram 72 contacts and closes yet a further switch 140 on its downward movement and such switch 140 is connected to and controls the energization circuit of the cylinder 120 to first close such circuit and then to terminate operation of the air cylinder 120 and cause its piston rod 121 to return to its released position for the next operative cycle when the ram 72 is retracted.

As the ram 72 moves downwardly, it closes a switch 145 that connects to the operative circuit for the cylinder 105 to set the cylinder for movement of the plunger, or rod 106 in the direction indicated in FIG. 3. When the ram 72 moves up, switch 145 functions to actuate the cylinder 105 and retract the plunger 106 and rack bar 107 to set it for another cycle of operation.

*Open Contact Test Station*

After a motor protector 7 has been bent in the calibrating apparatus of the invention so that its contacts are opened, usually on two additional index actions of the carrier plate 4, such motor protector 7 is carried to the open contact test station similar to the pre-test station. Now the motor protector is operatively associated with an air cylinder 150 suitably carried by the frame 2. This air cylinder 150 is connected to an operative lever arm 151 in a manner similar to the lever 56 and control cylinder or solenoid 54. Thus the lever is journalled on the frame 2 and has an end extending to and operatively associated with the radially inner end of the ejector key 25 on the article support 6 at this open contact test station. A resilient brush 152 is suitably mounted on the frame 2 so that it will engage the end of the terminal 14 extending from the motor protector and, if such terminal and the contact 12 thereby opens the energization circuit for the cylinder 150, such cylinder will be actuated to cause the motor protector having the desired calibrated open contacts therein to be ejected from its article support at this test station for collection in a suitable hopper or receiving receptacle. A spring, like the spring 50a, may be positioned before the open contact test station.

*Additional Control Circuit Features*

FIG. 16 shows that a pair of power leads 160 and 161 are provided and connect to a suitable source of 110 volt A.C. supply. For simplification of the circuit diagram, the equivalent leads 160 and 161 are shown in different places in the circuit diagram all representing a common power supply. A lead 162 connects to the power supply lead 161 and extends to a conventional control solenoid valve 163 that regulates the operation of the control cylinder 54 to actuate such cylinder when the circuit to the valve 163 is opened. The opposite terminal of the solenoid connects through a lead 164 to the index table 4 that completes the control circuit for the solenoid 163 through the brush 50 that connects to a lead 165 extending back to the opposite power supply line 160.

The operative circuit for controlling actuation of the control cylinder 70 includes the contact 63 connected by a lead 166 to the normally closed control switch 130 and from it by lead 167 to a conventional control or solenoid actuated valve 168. The valve 168 is operatively connected to the ram cylinder 70 for controlling the position of the piston rod extending therefrom. A further lead 169 connects back to the opposite side of the power supply to complete the circuit through the solenoid 168. A brush 170 is shown connecting to a lead 171 extending from the opposite power supply lead and connecting to the index table to complete the circuit through the contact 63, a motor protector being tested and the carrier table 4 to move the ram piston rod 71 down and hold it down until the circuit through the motor protector is opened.

The control switch 145, which is first closed on downward movement of the piston rod or plunger 71 is operatively connected to a power supply to connect through leads 172 and 173 to a solenoid valve 174 that controls actuation of the control cylinder 105. A lead 176 is also present to connect the power supply directly to the switch 145 to complete energization thereof so that when the circuit through switch 145 is opened, the cylinder 105 will retract the piston rod of the cylinder 105.

The next control switch 140 which is closed by downward movement of the piston rod 71 may be directly connected to a power supply source and connect through leads 177 and 178 directly to a suitable control solenoid 179 that in turn is operatively connected to and controls actuation of the take-up cylinder 120 for direct actuation thereof upon closing the switch 140.

The switch 90 that energizes the oscillating drive provided for the ratchet bar 98 may be directly connected to a power supply source and one lead 180 extending therefrom connects to the normally closed switch 116 and through it by lead 181 to microswitch 182 the opposite terminal of which connects to a solenoid controlled valve 183. This solenoid valve 183 controls movement of the piston rod by control of air to the cylinder 102 and when energized moves the bar 98 in such a direction so that an arm 184 thereon moves towards a further control microswitch 185 and closes such switch 185 by the original actuation provided in the cylinder 102. The microswitch 185 has a lead 186 extending therefrom and connecting to the solenoid valve 183 to actuate it when the switch 185 is closed and cause the cylinder 102 to be so energized as to retract the bar 98 and move the arm 184 towards the switch 182 for closing it. These alternate actuations of the power circuits to the solenoid valve 183 cause the control bar 98 to oscillate back and forth through the limits of movement provided as long as the control switch 90 remains closed by engagement of the ram or similar member therewith. Suitable conduits 187 and 188 connect from the solenoid valve 183 to supply air under pressure to opposite ends of the control cylinder 102 to move it positively in reciprocating action, as desired. Similar conduits 189 and 190 connect opposite ends of the cylinder 102 to the cylinder 80 for series connection of these cylinders 102 and 80 so that the ram jaw or piston rod extending from the cylinder 80 will be moved to and from operative or clamped positions with each reciprocating action of the control bar 98 for desired release of a motor protector or other article at the bend station. Leads 160a and 161a complete the power supply circuit to the solenoid valve 183 and to the switch 185.

When the energization of the ram cylinder 70 is released and the ram or piston 71 moves upwardly, then the control switch 125 is energized to a lead 191 that connects such switch 125 to the solenoid valve 32 to energize such solenoid valve for air supply to the cylinder 30 for indexing movement of the piston 31 of the cylinder 30 to move the carrier table 4 through one step of index action. Another lead 192 connects to the solenoid 32 for completing the circuit thereto back to the power supply means.

The circuit for controlling the eject cylinder 150 is similar to that for the cylinder 54 and it includes a brush 152 that connects to one power supply lead and with a lead 194 extending from the carrier plate, or table 4 to a control solenoid valve 195 for the cylinder 150 whereby open circuit conditions in a motor protector being tested at this station will cause a change in the energization of the control solenoid 194 to actuate the cylinder 150 and effect an ejection of the test article at this station if its contacts are properly open, as desired.

It will be realized that all of the solenoids, solenoid valves and controls described in the specification are of the conventional construction and that equivalent means may be substituted therefor, as desired. These solenoid valves may be of the type that require only a pulse of energy thereto for their actuation, and that the valves will retain a given position until again energized. The air valves are of the type that will either remain in one position when given a pulse of energy supply to their controls, or with a second energization of the control solenoid being required, as desired, to change the air flow path. The air used in operation of the cylinders can be exhausted at the solenoid actuated valves, or at the control cylinders as required. To simplify circuit connections for the control air, some of such lines are omitted. Usually the air is exhausted at one of the control valves. Some solenoid actuated valves may have two solenoids provided therefor to move the valve to different settings.

Isolation transformers (not shown) are provided in the circuits for the solenoid valves 163 and 195 to isolate their control circuits from each other and from the circuit through the contact 63.

The apparatus is started by manually closing the switch 125 several times to send indexing pulses to the cylinder 30 after the motor protectors 7 are loaded onto the article supports 6 preceding the first test station. If a motor protector is ejected at the first test station, the switch 125 would be manually closed when the empty article support 6 reaches the bending station.

*Preheat Modification*

With reference to the modified form of the invention shown in FIGS. 17 through 21, this shows an accessory unit that may be used with the apparatus of the invention and by which automatic feeding and preheating for the thermal protectors, or similar articles being processed is provided. Thus, an annular means, or member, such as a drum 200, is shown suitably positioned in a vertical plane adjacent the periphery of a carrier plate or table indicated at 4a in the drawings and it has a plurality of axially extending grooves 201 in its periphery. The carrier plate 4a is equivalent, or the same, as the plate 4 shown in the other figures of the drawings and it has a plurality of means, or members such as the receiving plates 6a suitably secured to the carrier plate and positioned at equally circumferentially spaced portions on the periphery thereof. Thus as the carrier plate 4a rotates, by the indexing movement provided therefor, then the individual means affixed thereon will be presented adjacent the drum 200 for feed of preheated articles thereto. The drum 200 is so positioned that its upper margin is lying parallel to but slightly above a plane defined by the upper surface of the carrier plate 4a. The grooves 201 shown extend the length of the drum 200 and each groove is adapted to receive a thermal protector 7, or equivalent therein. A confining chamber is formed around the drum 200 by means of a suitable enclosure 202 positioned closely therearound and extending substantially around the entire circumference of the drum so that as the drum 200 is rotated, the protectors 7 received in the grooves will be retained therein. The enclosure 202 is broken away for clarity in the drawings.

Any suitable type of a heating means (not shown) is provided in association with the enclosure 202 to heat the enclosure, the drum 200 and the protectors 7 carried thereby to predetermined temperatures while such protectors are positioned in the enclosure. Suitable guide means, such as channels 203 and 204, are positioned in circumferentially spaced relation adjacent opposite faces of the drum 200. Thus the channel 203 is provided for receiving a thermal protector 7 or the like for feed to the drum 200 whereas the channel 204 is positioned for receiving a protector discharged from the drum 200. The channel 204 receives an article discharged from the drum 200 and passes it over to a proper station, or receiving means 6a on the carrier plate 4a. These channels 203 and 204 are arcuately spaced apart unitary multiples of the circumferential space between the adjacent grooves 201.

In order to provide for automatic movement of the thermal protectors 7 into and from the drum 200, a suitable plunger means, in this instance a plunger platen 205 having some type of bifurcated, or a pair of article engaging means thereon is present to move the articles being processed axially in the apparatus. In this particular instance, the plunger platen 205 is shown as having a short pusher bar 206 secured thereto adjacent the center portion thereof whereas a relatively long pusher bar or finger 207 is secured to about the mid-section of the plunger platen 205 and protrudes from an end thereof to a point adjacent the drum 200. Any suitable means, such as an air cylinder 208, is shown as having its piston rod 209 extending therefrom and secured to the plunger platen 205, as by means of a bracket 210. Hence on operative movement of the piston rod 209 in the air cylinder 208, the push bars 206 and 207 are caused, respectively, to engage an article 7 within the channel 203 and push it into one of the grooves 201, or to engage a thermal protector 7 in one of the grooves 201 and force it therefrom through the channel 204 to seat on one of the associated means 6. The controls, such as a solenoid valve (not shown) for the air cylinder 208 would be connected into the circuit means shown in FIG. 16, such as a circuit controlled by the control switch 145, so that such plunger platen 205 would be actuated, for example, substantially when the calibrating and bending action is being performed on one of the thermal protectors at the calibration station, and naturally when the carrier plate 4a is in a fixed position.

Any suitable means, such as a supply chute 211, indicated in FIG. 18, may be provided for supply of individual thermal protectors 7 to the channel 203 automatically from some type of a storage hopper therefor. Or, if desired, the articles being processed could be manually fed to the channel 203 or be manually stacked in the associated chute, or hopper 211.

The automatic indexing movement of the drum 200 to present articles for supply to the carrier plate 4a is provided, as by means of a reciprocable plunger, or index member 212 that is shown in position for reciprocation in suitable means in FIGS. 19 and 20. The drum 200 is provided with a plurality of equally circumferentially spaced, axially extending index pins 213 secured to one side thereof, and the index member 212 is positioned to have a beveled or inclined upper end indicated at 214 inserted between adjacent pins 213 in the manners indicated in FIGS. 19 and 20 to provide the index movement of the drum, and to lock the drum in a fixed position intermediate each index motion.

The reciprocating movement of the indexing member 212 is provided through a member such as an air cylinder 215 that has a piston rod 216 extending therefrom and which connects to the index member 212, as by means of a clevis 217 which is pivotally engaged with the index member 212 by a pin 218. The end 219 of the index member 212 remote from the drum 200 is made to a generally spherical contour indicated and the remainder of the index member 212 is appreciably smaller than an enclosing block 220, in which the index member 212 is positioned for its controlled movement. A resilient means, such as a spring 221, is shown engaging a block 222 that is slidably positioned in the block 220 and carries a ball bearing 223 at its lower surface for rotatably engaging the associated upper edge of the index member 212 to urge it downwardly at all times. A support roller 224 engages the index member 212 adjacent its forward end and, when the index member is retracted, such support roller engages a horizontally extending portion 225 on the lower surface of the index member and which has a downwardly inclined section 226 extending rearwardly of the index member from such flat surface. Hence upon forward movement of the index member 212 through actuation of the air cylinder 215, the inclined surface 214 of the index member 212 will engage one of the pins 213 and will cause the drum 200 to move upwardly as the index member is moved radially inwardly of the drum because of the vertical movement provided in the index member through engagement of the roller bearing, or support roller 224 with the inclined plane, or surface 226 on the index member. The extent of arcuate movement can be limited through a lock screw 227 shown on the block 220. Normally the radial thickness of the index member 212 at its forward end is equal to the spacing between adjacent index pins 213 so that retention of the index member at its forward position will lock the drum 200 in a given position.

The control cylinder 215 normally should be connected in the control circuit shown in FIG. 16 and with the valve for such air cylinder 215 being energized substantially simultaneously with the means, as by the switch 125, used to occasion the index motion of the carrier plate 4a. The cylinder 215 might have a normal position as shown in FIG. 19 and be pulled back to the position of FIG. 20 by actuation thereof after which the index member 212 would drop down a pin and be moved forwardly by a spring or other means. The drum 200 may be retained against counter-rotation by conventional means.

The size of the drum 200 may be varied within conventional limits so that it will be seen that the preheat drum 200 can be used to automatically bring the articles processed to a desired preheat condition. The articles thus are automatically fed both to the drum for preheat action and then are deposited on the carrier plate 4a for further processing. This preheat apparatus may be used with the apparatus of the invention without any appreciable modification thereto except for supply of a feed opening through the oven or compartment formed around the processing apparatus. Naturally such preheat means can be eliminated from the apparatus when an automatic preheat is not desired. Or, articles may be manually fed or placed in the drum 200 and/or be manually placed on the carrier plate, when desired.

*Bending Station—Yoke Vertically Movable*

A modified control and positioning assembly for the fork or yoke at the bending station is shown in FIGS. 21, 22 and 23. Such apparatus may be substituted for that shown in the other figures of the drawings and it provides vertical movement of the yoke to engage a motor protector, or similar article, rather than requiring vertical movement of the article on the carrier table to engage the yoke as shown in such other figures. Hence, the motor protector 7 would be positioned on an article support 6, or a support bar 17, that would be fixedly secured to the carrier plate and it would be moved to a protruded position at the bending station by a member, such as the cam 60.

In this modification, a yoke or fork 300 has, for example, a rectangular extension 301 extending downwardly therefrom, and it would be positioned in the same relation to the carrier plate 4 as the yoke 62. Such extension 301 is slidably received in a positioning cylinder 302 for vertical movement with relation thereto. The yoke 300 has a flanged guide ring, or member 303 formed thereon or secured thereto and engaged by a bifurcated support 304. The support 304 is operatively secured to and positioned for vertical movement by a piston rod 305 extending from a fixedly positioned air cylinder 306 or the like. The piston rod 305 engages a bracket 320 that is secured to a carrier plate 321 slidably positioned between gibs 322. The carrier plate 321 extends up to the support 304 and is secured thereto by cap screws 323. The cylinder 306, when energized, moves the yoke 300 up to engage a thermal protector on the carrier plate 4 for bending action thereon. The bending action is obtained by a worm gear 307 carried by the positioning cylinder 302 adjacent the lower end thereof. The cylinder 306, for example, would be connected in the circuit for the cylinder 70 to be energized when the brush 63 strikes an article as moved to the bending station. A worm 308 engages the worm gear 307 and it is driven in the same manner as the worm 95 described hereinbefore.

Upon termination of the bending of the end of a thermal protector, the cylinder 306 would be energized through the control circuit providing the retraction of the piston rod 71 to return the yoke 300 to its lowered position. At the same time, the cylinder 105 or equivalent member connecting to the worm 308 would be returned to its starting position to bring the yoke 300 to its neutral or starting position for incremental bending action.

If desired, the tests on the motor protectors to determine if the contacts are closed or open can be separately performed, and the apparatus of the invention may only perform the automatic, progressive bending of the thermal protector for calibration action thereon. In some instances, it may be desirable to preheat the motor protectors or controls and to permit the apparatus to function exposed to the atmosphere, or rough calibration action may be provided at ambient temperatures and no preheating or cooling of the articles be provided.

The indexing control cylinder 30 and associated means is a commercial item and any equivalent means may be used in lieu thereof.

From the foregoing, it will be seen that a novel, improved, automatically operated apparatus has been provided by the invention for calibrating thermostats, motor protectors, and other thermal protectors or controls so that they can be physically set so that the contacts therein will be opened at a predetermined temperature but that they will be closed below such temperature. Obviously, the reverse of such calibration set up can be provided, if desired, whereby the contacts can be made to close at a predetermined temperature by proper design of the thermal protector or control. Hence, it is believed that the objects of the invention have been achieved.

While several complete embodiments of the invention have been disclosed herein, it will be appreciated that modification of these particular embodiments of the invention may be resorted to without departing from the scope of the invention as defined in the appended claims.

What is claimed is:

1. Apparatus for automatically calibrating thermal protectors, or similar articles having a heat responsive contact carrying metal strip extending thereinto as a cantilever from an end thereof, said articles having normally closed contacts therein spaced from said end thereof, which apparatus comprises a frame, a carrier plate positioned on said frame for rotation in a horizontal plane, a plurality of article supports resiliently carried by said carrier plate about it and at uniformly spaced peripheral portions thereof for limited vertical movement, index means to engage and move said carrier plate an index step equal to the circumferential spacing of said article supports, said carrier plate being indexable by said index means to be moved thereby from one work station to another, a ram carried by said frame for vertical movement into engagement with an article support at a work station and move it down to contact said carrier plate, jaw means operatively associated with said ram to engage a portion of an article on a said article support at a work station and retain it stationary, automatic bending means operatively carried by said frame at said work station to engage and bend the first said end of an article on a said article support progressively by small increments, control means for said jaw means connecting thereto to release said jaw means between each increment of movement of said bending means, and circuit means connecting to said carrier plate and to an article at said work station to energize said last-named means until the contacts therein are opened.

2. Apparatus for automatically calibrating thermal protectors, or similar articles having a heat responsive contact carrying metal strip extending thereinto as a cantilever from an end thereof, said articles having normally closed contacts therein spaced from said end thereof, which apparatus comprises a frame, a carrier plate positioned on said frame for rotation in a horizontal plane, a plurality of article supports carried by said carrier plate at uniformly spaced peripheral portions thereof, index means to engage and move said carrier plate an index step equal to the circumferential spacing of said article supports, said carrier plate being indexable by said index means to be moved thereby from one work station to another, a ram carried by said frame for vertical movement into engagement with an article on a said article support at a work station, jaw means operatively associated with said ram to engage a portion of an article on a said article support at the work station and retain it stationary, automatic bending means operatively carried by said frame at said work station to engage and bend the first said end of an article on a said article support progressively by small increments, and circuit means connecting to said carrier plate and to an article at said work station to energize said last-named means until the contacts in said article are opened.

3. Apparatus as in claim 2 where means are present to release said jaw means between each increment on movement of said bending means.

4. Apparatus as in claim 2 where said bending means include an article engaging member, a means operatively connected to said article engaging member to move it rapidly through an arc to take up slack in any connections therebetween and to exert a pressure on an article at the test station without any appreciable bending of such article, and a second means operatively engaging said article engaging member to move it through arcuate increments to bend an end of an article while clamped in a fixed position at another portion thereof by said jaw means.

5. Apparatus for automatically calibrating thermal protectors, or similar articles having a bimetal strip extending thereinto from an end thereof, said articles having normally closed contacts therein spaced from said end thereof, comprising a frame, a carrier plate journalled on said frame for rotation in a horizontal plane, a plurality of article supports carried by said carrier plate at uniformly spaced peripheral portions thereof, index means carried by said frame to engage and move said carrier plate an index step equal to the circumferential spacing of said article supports, said carrier plate being indexable by said index means to be moved thereby from one work station to another, the said end of said article on a said article support protruding from said article support, first means operatively carried by said frame at a first work station to bend the said end of an article on a said article support progressively until the contacts therein are opened, means operably associated with said carrier plate at said bending work station to move said article to protrude farther from said article support, second means operatively positioned on said frame adjacent a second work station for said carrier plate to remove articles on a said article support at such station if its contacts are open, and automatic control means operatively connected to said index means and to said second named means to actuate them after completion of a bending action on an article at said first work station.

6. Apparatus for automatically calibrating thermal protectors, or similar articles having a heat operable contact carrying bimetal strip extending thereinto as a cantilever from an end thereof, said articles having normally closed contacts therein spaced from said end thereof, which apparatus comprises a frame, a carrier plate journalled on said frame for rotation in a horizontal plane, a plurality of article supports carried by said carrier plate at uniformly spaced peripheral portions thereof, index means carried by said frame to engage and move said carrier plate an index step equal to the circumferential spacing of said article supports, said carrier plate being indexable by said index means to be moved thereby from one work station to another, means operatively carried by said frame to move a said article on said article support so that such article has said end thereof protruding from said article support, jaw means operatively associated with said frame to engage the other end of an article on a said article support at a work station and retain it stationary, automatic means operatively carried by said frame at said work station to bend the first said end of an article on a said article support progressively by small increments until the contacts therein are opened, test means operatively positoned on said frame adjacent a second work station for said carrier plate to test articles on a said article support at such station to determine if its contacts are open and to eject articles from the said article support if its contacts are open, and automatic control means operatively connected to said index means and to said jaw means to operate them after completion of a bending action on an article at said first work station, said control means also actuating said automatic means when an article on a said article support is moved to said work station.

7. Apparatus for calibrating thermal protectors, or similar articles having a bimetal strip extending thereinto from an end thereof, said articles having normally closed contacts therein spaced from said end thereof, comprising a frame, a carrier plate journalled on said frame for rotation in a horizontal plane, a plurality of article supports carried by said carrier plate at uniformly spaced peripheral portions thereof, control means carried by said frame to move said carrier plate a fixed arcuate distance equal to the circumferential spacing of said article supports, an enclosure positioned to enclose said carrier plate, means connecting to said enclosure to heat it to a controlled temperature, said carrier plate being indexable by said control means to be moved from one work station to another and having a plurality of heating stations for an article thereon, means operatively carried by said frame at a first work station to engage an article on said carrier plate and remove it therefrom if the contacts therein are open, the said end of said article on a said article support protruding from said article support, means operatively carried by said frame at a second work station to bend the said end of an article on the said article support progressively until the contacts therein are opened, and means operatively positioned on said frame adjacent a third work station for said carrier plate to remove articles on a said article support at such station if its contacts are open.

8. Apparatus for calibrating thermal protectors, or similar articles having a bimetal strip extending thereinto from an end thereof under controlled temperature conditions, said articles having normally closed contacts therein spaced from said end thereof, said apparatus comprising a frame, a carrier plate journalled on said frame, a plurality of article supports carried by said carrier plate at uniformly spaced peripheral portions thereof, control means carried by said frame to move said carrier plate a fixed arcuate distance equal to the circumferential spacing of said article supports, said carrier plate being indexable by said control means to be moved from one work station to another, means operatively carried by said frame at a first work station to engage an article on said carrier plate and remove it therefrom if the contacts therein are open, the said end of said article on a said article support protruding from said article support, means operatively carried by said frame at a second work station to bend the said end of an article on a said article support progressively until the contacts therein are opened, and means operatively positioned on said frame adjacent a third work station for said carrier plate to remove articles on a said article support at such station if its contacts are open.

9. Apparatus for calibrating thermal protectors, or similar articles having a bimetal strip extending thereinto from an end thereof under controlled temperature conditions, said articles having engageable contacts therein spaced from said end thereof, said apparatus comprising a frame, a carrier plate journalled on said frame, a plurality of article supports carried by said carrier plate at uniformly spaced peripheral portions thereof, control means carried by said frame to move said carrier plate a fixed arcuate distance equal to the circumferential spacing of said article supports, said carrier plate being indexable by said control means to be moved from one work station to another, means operatively carried by said frame at a first work station to engage an article on said carrier plate and remove it therefrom if the contacts therein are in undesired relationship, the said end of said article on a said article support protruding from said article support, means operatively carried by said frame at a second work station to bend the said end of an article on a said article support progressively until the contacts therein are changed in their open or closed relationship, and means operatively positioned on said frame adjacent a third work station for said carrier plate to remove articles on a said article support at such station if its contacts are in desired relationship.

10. Apparatus for calibrating thermal protectors, or similar articles having a bimetal strip extending thereinto from an end thereof under controlled temperature conditions, said articles having normally closed contacts therein spaced from said end thereof, said apparatus comprising a frame, a carrier plate journalled on said frame, a plurality of article supports carried by said carrier plate at uniformly spaced peripheral portions thereof, resilient means positioning said article supports on and above said carrier plate, control means carried by said frame to move said carrier plate a fixed arcuate distance equal to the circumferential spacing of said article supports, said carrier plate being indexable by said control means to be moved from one work station to another, the said end of said article on a said article support protruding from said article support, and bending means operatively carried by said frame at a work station to bend the said end of an article on a said article support progressively until the contacts therein are opened, said bending means including a vertically reciprocable member movable downwardly to engage a said article support and force it down against said carrier plate.

11. Apparatus as in claim 10 where said bending means include an article engaging member, a means operatively connected to said article engaging member to move it rapidly through an arc to take up slack in any connections therebetween and to exert a pressure on an article at the test station without any appreciable bending of such article, a second means operatively engaging said article engaging member to move it through arcuate increments to bend an end of an article while held in a fixed position at another portion thereof on said article support means, control means for said bending means, and circuit means connecting to said control means and closed by an article moved to said work station to actuate said bending means.

12. In apparatus for testing thermal protectors, or similar articles including a rotatable carrier plate having a plurality of article supports at uniformly spaced peripheral portions thereof, a frame, an ejector key slidably carried by each of said article supports on a radially inner section thereof, said ejector key on radially outward movement thereof contacting an article and moving if off of said article support, a control member carried on said frame and having a reciprocable plunger extending therefrom, and a control lever journalled on said frame and pivotally secured to said plunger, one end portion of said lever extending to a point adjacent and radially inwardly of said ejector key, said control member and control lever being constructed and arranged to move an article from said article support when the energization of said control member is changed.

13. Apparatus for calibrating thermal protectors, or similar articles having a bimetal strip, or equivalent, extending thereinto from an end thereof, said articles having operatively associated contacts therein spaced from said end thereof, said apparatus comprising a frame, a carrier plate journalled on said frame, a plurality of article support means on said carrier plate at uniformly spaced peripheral portions thereof, control means carried by said frame to move said carrier plate a fixed arcuate distance equal to the circumferential spacing of said article support means, said carrier plate being indexable by said control means to be moved from one work station to another, the said end of said article on a said article support means protruding therefrom, bending means operatively carried by said frame at a work station to bend the said end of an article on a said article support progressively by increments until the contacts therein are changed in operative association with each other, and means operatively associated with said article support means to retain the portions of an article on a said article support means at said work station in a given position but to release a said article between each increment of bending thereof.

14. In combination in apparatus for automatically processing thermal protectors and like articles,
   a carrier plate defining a plane and having means at the periphery thereof for receiving and positioning thermal protectors,
   means positioning said table horizontally for indexing movement,
   annular means having a plurality of axially extending grooves in the periphery thereof extending the length of such annular means,
   means for heating said annular means and for retaining articles in the grooves thereof,
   means positioning said annular means in a vertical plane adjacent said carrier plate with the upper margin in the plane of said plate,
   a pair of guide means positioned adjacent said annular means in circumferentially spaced relation but aligned with different ones of said grooves for guiding articles thereto and for leading articles therefrom to said carrier plate,
   bifurcated plunger means reciprocably positioned adjacent said annular means for movement parallel to the axis thereof,
   said plunger means partly lying in the plane of said carrier plate,
   means engaging said plunger means to move it towards said carrier plate to engage an article in one of said guide means to move it into a groove in said annular means and to move an article received in another of said grooves therefrom through said other guide means onto said means on said carrier plate, and
   means positioned adjacent said annular means to move said annular means through increments of arcuate movement to align grooves in said annular member with said plunger means.

15. In combination in apparatus for automatically processing thermal protectors and like articles,
   a carrier plate defining a plane and having means at the periphery thereof for receiving and positioning thermal protectors,
   means positioning said table horizontally for indexing movement,
   annular means having a plurality of axially extending article receiving grooves in the periphery thereof extending the length of such annular means,
   means for heating said annular means and for retaining articles in the grooves thereof,
   means positioning said annular means in a vertical plane adjacent said carrier plate with the upper margin in the plane of said plate,
   guide means positioned adjacent said annular means in aligned relation with one of said grooves for guiding articles therefrom to said carrier plate,
   means to supply a thermal protector to said guide means,
   bifurcated plunger means reciprocably positioned adjacent said annular means for movement parallel to the axis thereof,
   said plunger means partly lying in the plane of said carrier plate,
   means engaging said plunger means to move it towards said carrier plate to engage an article in said guide means to move it into a groove in said annular means and to move an article received in another of said grooves therefrom onto said means on said carrier plate, and
   means positioned adjacent said annular means to move said annular means through increments of arcuate movement to align grooves in said annular member with said plunger means.

16. In combination in apparatus for automatically processing thermal protectors and like articles,
   a carrier plate defining a plane and having means at the periphery thereof for receiving and positioning thermal protectors,
   means positioning said plate horizontally for indexing movement,
   heated annular means positioned adjacent said carrier plate and having a plurality of article receiving sections therein,
   means for automatically postioning articles in said article sections,
   means operatively connecting to said annular means to move it through increments of arcuate movement, and
   means to move heated articles from said annular means onto said means on said carrier plate.

17. In combination with apparatus for automatically processing thermal protectors and like articles, and including a carrier plate defining a support plane and having means at the periphery thereof for receiving and positioning articles, and means positioning said table horizontally for indexing movement;
   annular means having a plurality of axially extending grooves in the periphery thereof for the processed articles and journalled in a vertical plane adjacent said carrier plate with the upper margin of such annular means in the support plane of said plate,
   means for heating said annular means and for retaining articles in the grooves thereof,
   guide and control means positioned adjacent said annular means and aligned with one of the upper ones of said grooves for forcing articles therefrom onto said carrier plate, and
   means engaging said guide and control means to move it towards said carrier plate to engage an article in one of said grooves in said annular means and to move it onto said means on said carrier plate.

18. In combination with apparatus for automatically processing thermal protectors and like articles, and including carrier plate defining a support plane and having means at the periphery thereof for receiving and positioning articles, and means positioning said table horizontally for indexing movement;
   annular means having a plurality of axially extending sections in the periphery thereof for the processed articles and journalled in a vertical plane adjacent said carrier plate with the upper margin of such annular means in the support plane of said plate,
   means for heating said annular means to a controlled temperature,
   means for retaining articles in the sections of said annular means as it is rotated,
   control and plunger means positioned adjacent said annular means and aligned with one of said sections for forcing articles therefrom onto said means on said carrier plate, and
   means positioned adjacent said annular means to move said annular means through increments of arcuate movement to align different sections in said annular means with said control and plunger means.

19. In combination with apparatus for automatically processing thermal protectors and like articles, and including a carrier plate defining a support plane and having means at the periphery thereof for receiving positioning thermal protectors, and means positioning said plate horizontally for indexing movement;
   annular means having a plurality of axially extending sections in the periphery thereof for processed articles and journalled in a vertical plane adjacent said carrier plate with the upper margin of such annular means in the support plane of said plate;
   means for heating said annular means and for retaining articles in the sections thereof,
   reciprocably movable control means positioned adjacent said annular means and aligned with different ones of said sections for forcing articles therefrom onto said carrier plate, means operatively engaging said control means to move it towards and from said carrier plate, means operatively engaging said annular means to move said annular means through increments of arcuate movement to align different sections in said annular means with said control means, means for providing indexing movement of said carrier plate, and means operatively connecting to the said means that operatively engage said control means, the said means that operatively engage said annular means, and the said carrier plate indexing means to correlate the actions thereof.

20. Apparatus as in claim 17 where means operatively engage said automatic bending means and position it for reciprocation in a vertical direction with relation to said positioning means to thereby engage and disengage said automatic bending means with an article on said positioning means.

21. Apparatus for calibrating thermal protectors, or similar articles having a bimetal strip extending thereinto from an end thereof under controlled temperature conditions, said articles having normally closed contacts therein spaced from said end thereof, said apparatus comprising a frame, a carrier plate journalled on said frame, a plurality of article supports carried by said carrier plate at uniformly spaced peripheral portions thereof, control means carried by said frame to move said carrier plate a fixed arcuate distance equal to the circumferential spacing of said article supports, said carrier plate being indexable by said control means to be moved from one work station to another, the said end of said article on a said article support protruding from said article support; and bending means operatively carried by said frame at a second work station to bend the said end of an article on a said article support progressively, said bending means including an article engaging member, a means operatively connected to said article engaging member to move it rapidly through an arc to take up slack in any connections therebetween and to exert a pressure on an article at the bending station without any appreciable bending at such article, and a second means operatively engaging said article engaging member to move it through arcuate increments to bend an end of the article.

References Cited in the file of this patent
UNITED STATES PATENTS

| | | |
|---|---|---|
| 2,355,468 | Robb | Aug. 8, 1944 |
| 2,490,741 | Pashby | Dec. 6, 1949 |
| 2,859,608 | Bear et al. | Nov. 11, 1958 |